May 27, 1969
G. D. BOEHLER ET AL
3,446,175
MARGINAL TERRAIN VEHICLE
Filed July 26, 1967
Sheet 2 of 3
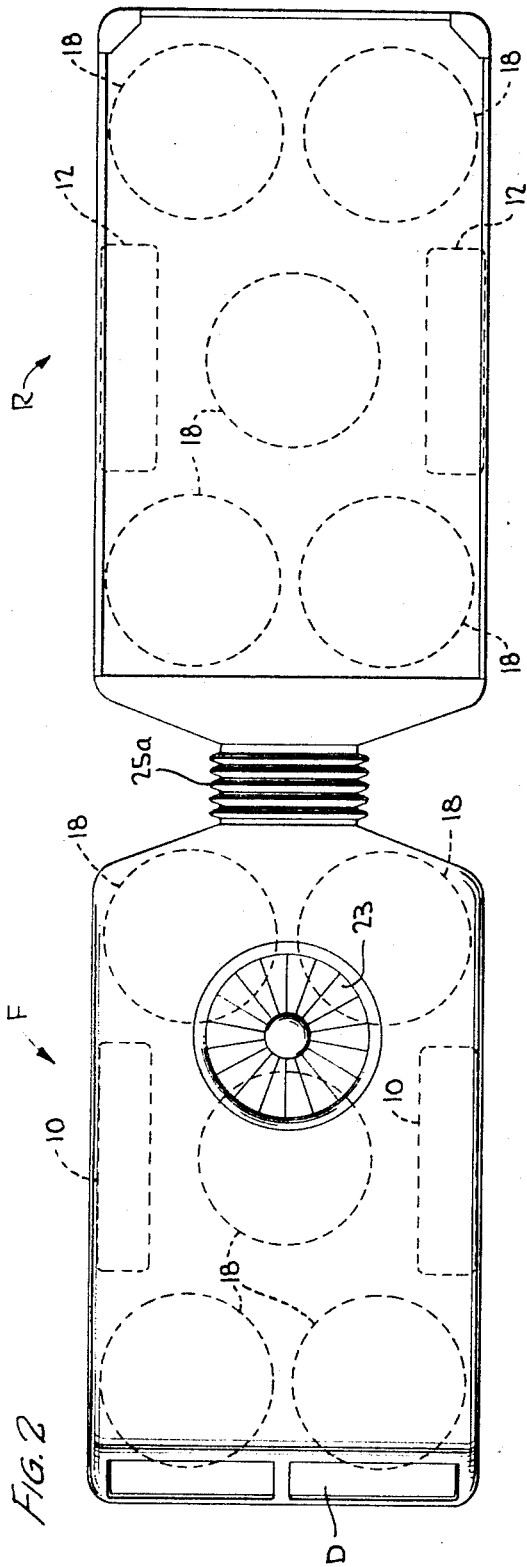
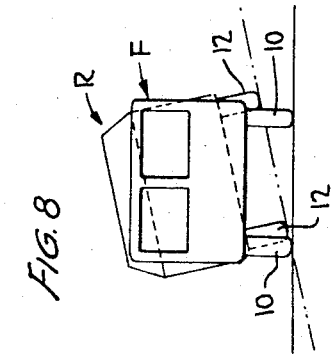
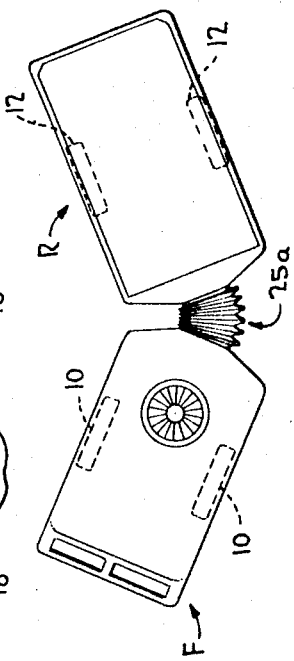
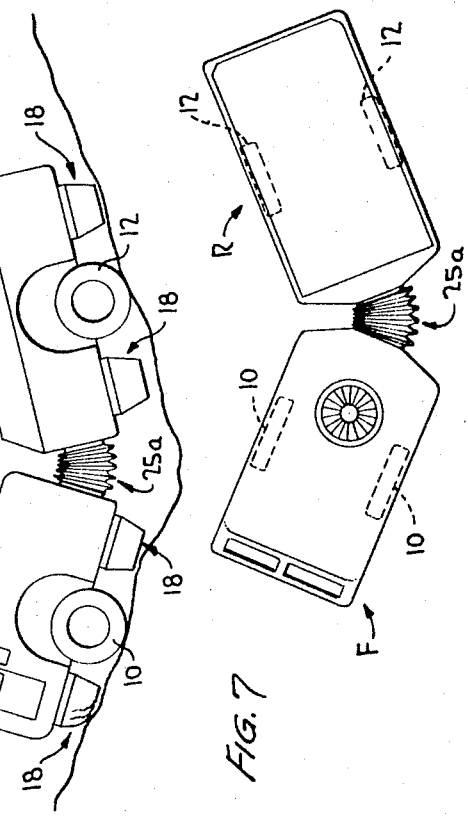
INVENTORS,
GABRIEL D. BOEHLER
WILLIAM F. FOSHAG
BY *Watson, Cole, Grindle & Watson*
ATTORNEYS

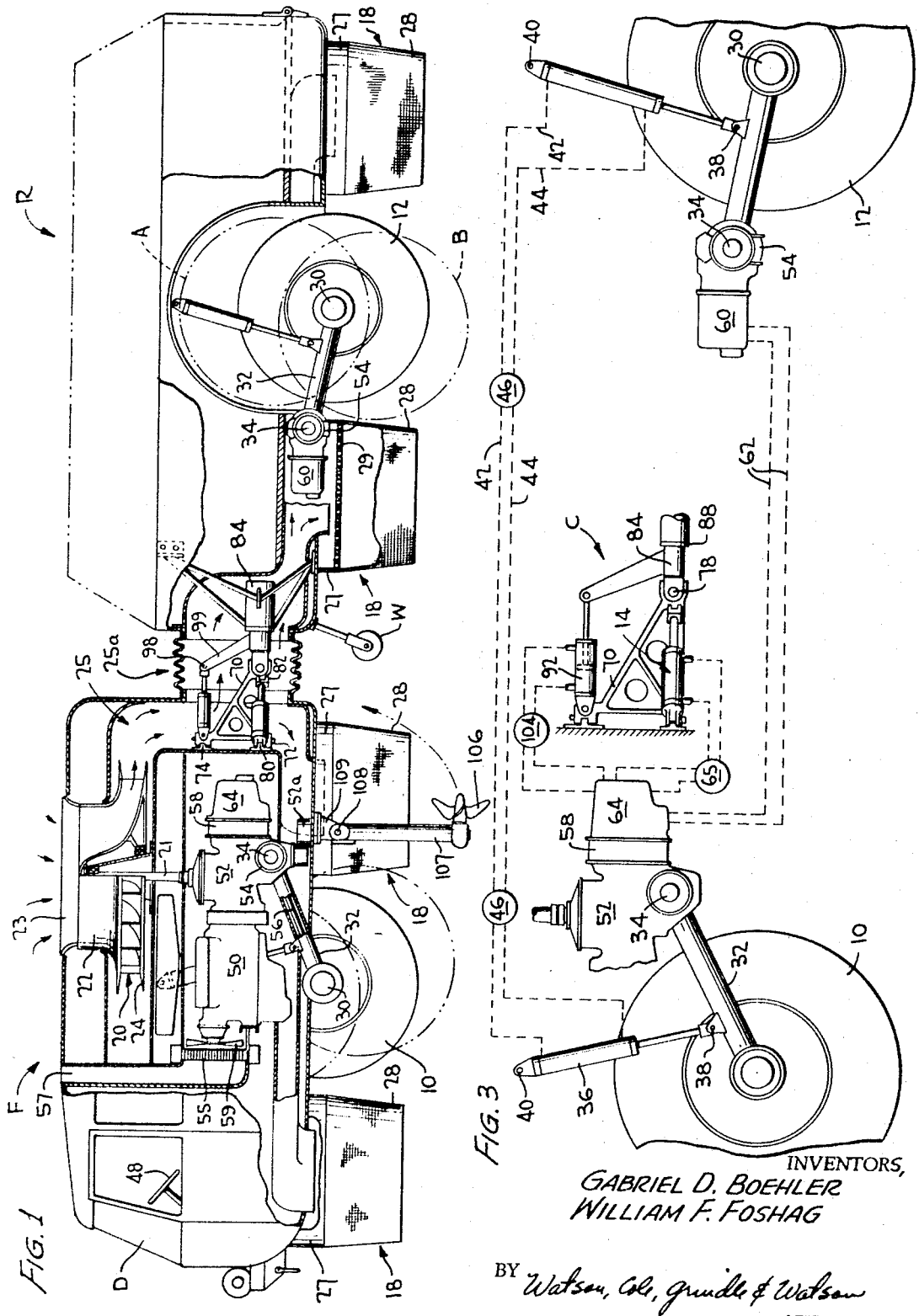

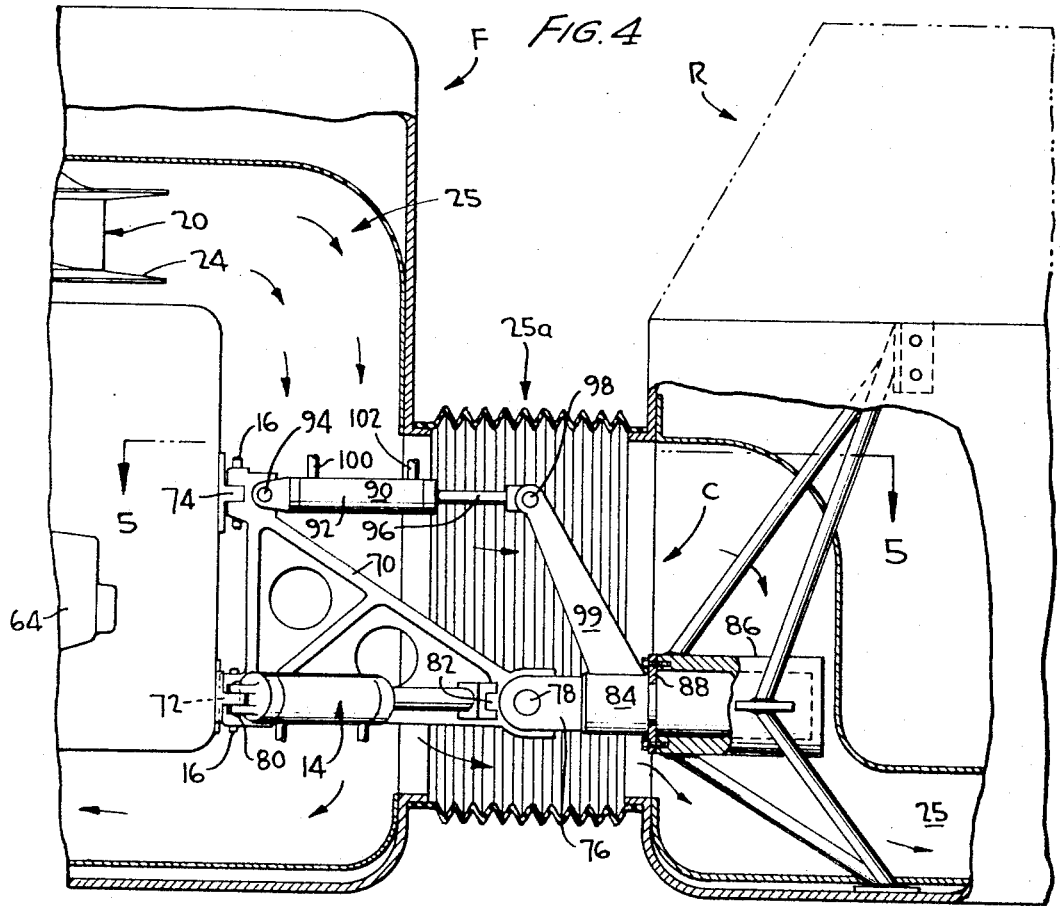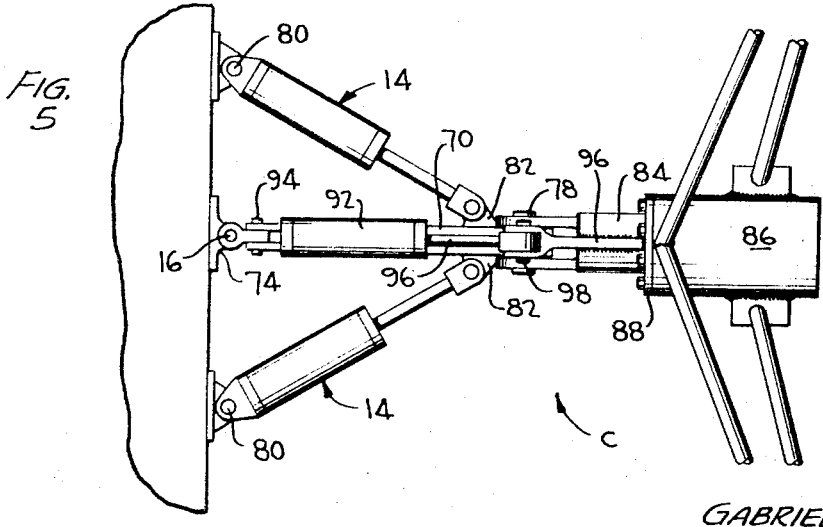

United States Patent Office 3,446,175
Patented May 27, 1969

3,446,175
MARGINAL TERRAIN VEHICLE
Gabriel D. Boehler and William F. Foshag, Washington, D.C., assignors to Aerophysics Company, Washington, D.C., a corporation of the District of Columbia
Filed July 26, 1967, Ser. No. 656,244
Int. Cl. B60f 3/00; B60v 3/02
U.S. Cl. 115—1                    12 Claims

ABSTRACT OF THE DISCLOSURE

A marginal terrain vehicle capable of being sustained in selectively variable proportions by air pad cushions and/or wheels. The air supply for the cushions and the drive for the wheels is derived from a common power source, and the wheels are vertically adjustable to sustain any desired proportion of the vehicle weight. The vehicle is composed of articulately connected sections, each having a single pair only of wheels midway of its length, while the air cushion pads are disposed on opposite longitudinal sides of the wheels of each section so that, when used in conjunction with the wheels, they will balance each section on its single pair of wheels. Steering is achieved by horizontal angular movement between the body sections and pairs of wheels.

BACKGROUND

A conventional wheeled vehicle is normally incapable of efficient use over water and marginal terrain because of its tendency to bog down in soft or marshy areas, its lack of sufficient buoyancy for movement through water, as well as its lack of efficient water propulsion means and its resistance to movement through the water.

A conventional ground effect machine, though capable of efficient use over water, is unfit for efficient use over land or marginal terrain due to the poor steering, hill climbing, and braking ability inherent in such machine. Also, a ground effect machine is incapable of efficient use at moderate or high speeds over rough terrain because of its inability to rise over solid obstacles such as rocks, banks, and the like, in its path of movement.

SUMMARY

The present invention employs features of both types of vehicles in combination to provide a vehicle which is capable of use either wholly in the manner of a ground effect machine or a wheeled land vehicle and, more importantly, is capable of combining the modes of operation of each type of vehicle in such varying proportions as may best adapt the vehicle for movement over various types of marginal terrain, such as swamps, marshes, rice paddies, deltas, and the like.

BRIEF DESCRIPTION OF THE DRAWINGS

Referring now in detail to the preferred exemplification of the invention as shown in the accompanying drawings in which:

FIGURE 1 is a vertical longitudinal section, partly in side elevation, of a vehicle incorporating the invention;

FIGURE 2 is a plan view of the structure shown in FIGURE 1;

FIGURE 3 is a diagrammatic view of the various fluid driving and control circuits for the wheels and the articulated connection between the vehicle sections;

FIGURE 4 is an enlarged vertical sectional view through the articulated connection and adjacent portions of the vehicle;

FIGURE 5 is a section on the line 5—5 of FIGURE 4;

FIGURE 6 is a diagrammatic side elevation of the vehicle showing the relative positions of the vehicle sections in passing over a ditch or depression;

FIGURE 7 is a plan diagrammatic view of the vehicle when making a turn; and

FIGURE 8 is a reduced diagrammatic end elevation of the vehicle showing its sections relatively tilted about their roll axis.

DESCRIPTION OF THE PREFERRED EMBODIMENT

The vehicle shown in the drawings comprises separate front and rear body sections F and R respectively normally aligned with each other in the direction of movement of the vehicle and interconnected by an articulated coupling, generally designated C, for relative universal angular movement. For movement over solid or semisolid surfaces, each vehicle is adapted for support in varying degrees by a single pair only of wheels 10—10 and 12—12 which are spaced apart transversely to the direction of movement of the vehicle and are rotatable about normally substantially aligned axes. An individual axis of pitch movement for each vehicle section is thus defined by a line through the centers of its wheels 10—10 and 12—12 respectively. It is to be noted that the pair of wheels for each said body section is normally disposed substantially beneath the center of gravity of that section midway of the length of the section.

For steering the vehicle, there are provided suitable power means, exemplified by the extensible and contractible hydraulic units 14—14 for relatively swinging the vehicle sections in a horizontal plane about a vertical axis hereinafter referred to as their steering axis 16. It will be apparent that such relative horizontal swinging movement between the vehicle sections will partially "jackknife" them and thus will place the wheels of the leading section at an angle to those of the trailing section whereby to achieve directional control over the vehicle.

In conjunction with the wheels 10—10 and 12—12, each vehicle section includes a plurality of preferably circular in plan air cushion pads 18 disposed therebeneath in a common horizontal plane symmetrically to the pitch axis defined by its associated wheels. For supplying air to provide air cushions beneath the respective pads, there is a suitable air supply means herein exemplified by a radial fan 20 of conventional construction and connected to the respective pads through an air duct system generally designated 25.

The fan 20 is supported on a vertical drive shaft 21 which is driven from the motor via transmission unit 52, and is enclosed by a housing 22 having an upwardly directed air inlet 23 and a radially directed annular discharge nozzle 24. From the nozzle 24, the air is received in the duct system 25, portions of which extend into both vehicle body sections and are interconnected by a flexible coupling 25a. The duct system communicates with the air cushion pads 18 through ports 26 respectively opening downwardly through the rigid upper portions or hoods 27 of the pads 18. It is to be noted that the flexible couplings 25a of the duct system encloses the articulated connection C between the vehicle sections, for flexing therewith, and at the same time provides a certain amount of protection for the articulated connection.

Each air cushion pad 18 also is provided with a flexible skirt 28 depending from its circular lower periphery and preferably converging downwardly to a slight degree into near proximity with the ground or other supporting surface. Due to the flexibility of the skirts 28, these will be able to yield individually and ride over any obstacles projecting abruptly upwardly from the surface over which the vehicle is moving. Because of their near proximity to the support surface, it will be apparent that the flexible skirts will permit utilization of the vehicle in the manner of a ground effect machine with a minimum expenditure of air and yet with minimun risk of damage to the air cushion pads. The lateral confining of the air within the downwardly tapering skirts will, by inflating the skirts, maintain their circular configuration.

It is desirable to make suitable provision against the escape of a disproportionate amount of air from a pad 18 which at any given time is spaced so far above the earth's surface as to be relatively ineffectual. There are various known expedients available for this, one of which, as illustrated diagrammatically in the drawings, consists of the disposition in each pad of a flow restrictor in the form of a plate 29 extending across and occupying the full horizontal cross sectional area of the pad and formed with a plurality of suitably distributed performations 29', the total area of which is selected to permit passage of but a slight excess of the amount of air required by each pad during its normal operation. Thus, in the event of the elevation of any given pad to an undue and ineffectual height, this will not result in undue expenditure of air from the fan but rather will involve only a temporary minimum increase in the air consumption of the respective pad. This, together with the utilization of the flexible skirts for the respective pads permitting them to operate in unusually near proximity to the supporting surface without damage from obstructions, provides a very desirable economy of usage of the air, and substantially equalizes the lifting thrusts of the respective pads.

In order to provide for convertibility of the vehicle for use either as a ground effect machine or a land vehicle and to permit combined use of the air cushion pads and wheels to jointly support the weight of the vehicle over marginal terrain, there are provided means for selectively vertically adjusting the positions of the wheels 10—10, 12—12 from a fully retracted inoperative position, as shown by broken line A in FIGURE 1, to fully downwardly projected operative position substantially below the level of the air cushion pads, as indicated by broken line B in the same figure.

To this end, each wheel is mounted on a stub axle 30 rotatably supported at the free end of a swingable hollow arm 32, the upper end of which is pivotally connected at 34 to the vehicle section for movement about a generally horizontal axis transverse to the direction of forward motion of the vehicle. For adjusting and maintaining the angular position of each such hollow arm 32 and thus the elevation of its associated wheel, there is provided an extensible and contractible fluid actuated rigid wheel positioning unit 36 preferably of the piston and cylinder type. The lower end of each such unit is pivotally connected to the arm 32 adjacent its free end, as at 38, while the upper end of the same unit is pivotally connected to the body section at a fixed location thereon by a pivot 40, as shown. Preferably each such extensible and retractible unit is of the double acting type having fluid supply and withdrawal lines 42, 44 connected to a suitable source of pressurized fluid through a conventional reversing valve 46, all as indicated diagrammatically in FIGURE 1. The fluid will preferably be of a resiliently compressible nature, such as is employed in conventional liquid springs, so that the units 36 may function as springs for the respective wheels.

Where each extensible and retractible fluid actuated unit 36 is equipped with its own individual reversing valve 46 for controlling its supply of fluid, it is contemplated that the raising and lowering of the respective wheels will be individually controlled by suitable means (not shown) in the driver's compartment of the leading vehicle section. Manifestly, by appropriate control of the respective valves, the wheels may be individually raised and lowered as necessary to maintain the vehicle substantially level. Also, in marginal terrain such control makes possible the raising of any individual wheel which might become mired in soft mud or which might encounter a relatively high obstacle tending to block its forward movement.

In the embodiment of the invention here shown, the forward or leading vehicle body F is of any suitable water-tight construction and comprises a driver's cab D from which the vehicle is steered by steering wheel 48 and otherwise controlled. Body F also houses a source of power such as a conventional internal combustion engine 50, a part of the output of which is delivered through a change speed transmission 52 and a differential gearing 54, to the wheels 10—10. Cooling air is drawn through the radiator 55 through duct 57 by the fan 59. The power to each wheel is transmitted by way of the cross shaft or axle 34 (which functions also as a pivot for the arm) from the differential to a rotary power shaft 56 rotatably journalled within the swingable arm for each wheel 10—10 and thence through suitable gearing (not sown) to each of the wheels of the forward vehicle section. The transmission of driving power from the change speed transmission to the forward wheels is preferably controlled by a conventional clutch unit 58.

While a mechanical drive direction between the engine and the forward drive wheels is herein illustrated, the particular form of such drive is not essential to the invention and the drive may obviously assume other forms, including individual electric or hydraulic motors for the respective wheels, chain drives, or others of the numerous types of driving mechanisms known to those skilled in the art.

The load carrying body R of the vehicle also is watertight and, in conjunction with the watertight body F, is capable of maintaining the vehicle afloat in event of failure of the air supply to air cushion pads 18.

While the front wheel drive thus described may be relied upon as the sole driving means for the forward propulsion of the vehicle at certain times, as for instance during travel over solid and comparatively smooth surfaces, it is desirable also to provide a drive means which may selectively be put to use for driving the rear wheels, or in other words the wheels 12—12 of the trailing vehicle section R, to thus establish a four-wheel drive.

For this purpose in the present embodiment, the relatively opposed rear wheels 12—12 have power transmitted thereto in the same manner as the front wheels through shafts 56 journalled in their respective hollow swingable arms 32 and thence through suitable gearing (not shown) to their respective axles 30. The power delivery shafts 56 in turn are driven through differential gearing 54. Thus, up to this point, the driving mechanism for the rear wheels is similar to that described in connection with the wheels of the forward or leading vehicle section. However, rather than to establish a positive mechanical drive between the articulately connected front and rear sections, it will be found preferable in most instances to provide the rear wheels with a fluid motor, such as the hydraulic motor 60, delivering its output to the differential unit 54 and connected by hydraulic lines 62 in circuit with a hydraulic pump 64 supported in the forward vehicle section in driven relation with the engine.

This same pump 64 may also serve conveniently as a source of pressurized fluid for control of the steering cylinders 14—14. In such event, the valve 65 through which the fluid is supplied to and withdrawn from the respective cylinders (as shown diagrammatically in FIGURE 1) is preferably controlled through rotary movement of the steering wheel in the driver's cab in a manner obvious to those skilled in the art.

Coming now to the specific structure of the articulated interconnection and steering arrangement between the leading and trailing vehicle sections, it will be seen that this articulated connection or coupling C comprises a rigid steering link 70 having vertically spaced pivotal connections 72 and 74 to the leading vehicle whereby it is supported for swinging movement about the vertical steering axis 16 on the latter. To the free or trailing end of this steering link is connected a clevis 76 which is connected to trailing section R and is angularly movable about the horizontal pivot pin 78 which interconnects the arm and clevis, thus providing an axis about which the vehicle sections F and R are capable of relative angular movement or pitch movement in a vertical plane.

The pivotal connection between the trailing end of the steering link and the clevis is such as to permit only vertical angular movement between the interconnected vehicle sections and to resist relative angular movement in a horizontal plane, whereby such horizontal angular movement is restricted to the vertical axis or steering axis 16 defined by the pivots 72, 74 earlier mentioned. The steering cylinder and piston units 14—14 have their forward ends pivotally connected at 80—80 to the forward vehicle section at transversely spaced locations on opposite sides of and eccentrically to the steering axis 16. From such locations, these converge rearwardly and are each pivotally connected at 82 to the trailing end of the steering link.

With this arrangement where fluid from the hydraulic pump 64 is simultaneously supplied to one cylinder 14 and withdrawn from the other, this will cause the first cylinder to increase its length and the latter to decrease its length, thereby swinging or jackknifing the vehicle sections angularly about their steering axis 16 and causing the pairs of wheels 10—10 and 12—12 to assume angular relations to each other for steering purposes, in the manner shown in FIGURE 7.

For permitting a relative rolling movement between the vehicle sections about an axis generally parallel to their line of travel, the clevis 76 is provided with a cylindrical stub shaft 84 which is trunnioned on the trailing vehicle section R through a bearing sleeve 86 affixed to the forward end portion of the trailing section, the bearing sleeve and stub shaft being secured against axial movement by suitable means such as a circular clip 88 received in a groove around the stub shaft and secured to the forward end of the bearing sleeve.

It will be apparent that, during movement over marginal terrain or other types of terrain wherein the air cushion pads 18 provide all or a substantial part of the support for the vehicle sections, the pads 18 will automatically tend to maintain horizontal stability of the vehicle sections due to their equalized distribution relative to the respective sections and their symmetrical arrangement with respect to the wheels. In the preferred arrangement shown, there are five of such pads 18 for each vehicle section. These are arranged in laterally spaced pairs on opposite longitudinal sides of the wheels, with the fifth such pad being centered between the wheels and the other pads. Where the wheels and air cushion pads both share in supporting the load, the symmetrical disposition of the pads with respect to the wheels will automatically maintain the respective vehicle sections generally level or in equilibrium about the pitch axis for each vehicle section extending between the centers of its wheels.

However, where the wheels alone are relied upon for supporting the entire load, substantially to the exclusion of the pads, the stabilizing effect of the air cushions will not be present. Therefore, in order to prevent uncontrolled pitch of the respective vehicle sections about the single pair of supporting wheels of each, it is desirable to provide means capable of either locking out or of damping relative pitching movement of the respective vehicle sections.

For this purpose, there is associated with the articulated connection between the vehicle sections a linearly extensible and contractible rigid link 90 which cooperates with the steering link in defining a parallelogram linkage in a vertical plane between the respective front and rear vehicle sections.

This link 90 is shown as comprising relatively telescopically interconnected parts, exemplified here by the cylinder 92 pivotally connected to the steering link at 94 closely adjacent the steering axis 16 whereby to be swingable with the steering link about said axis, and a piston rod 96 extending from a piston (not shown) reciprocable within the cylinder, the piston rod being pivoted at 98 to an arm 99 rigidly affixed to the stub shaft 84, for rolling movement therewith. The piston rod 96 and cylinder 92 constitute a double-acting extensible and retractible hydraulic unit in which the piston rod may be substantially locked against reciprocation in the cylinder to lock the interconnected vehicle sections against any substantial movement about their pivotal connection 78. By way of example only, the cylinder is provided with ducts 100 and 102 leading from its opposite ends through a control valve 104 to the hydraulic pump. The valve 104 may be closed to prevent escape of fluid from or its entry into either end of the cylinder. Alternatively, the valve 104 may be actuated to place the respective ends of the cylinder 92 in communication with either the supply or return line 105 and 107 from the pump to vary the pitch angle between the vehicle body sections as desired. The valve 104 may also be actuated as desired to disconnect both ends of the cylinder 92 from the pump 64 and to place them in communication with each other through a constricted orifice, for the purpose of damping the relative pitch movement between body sections F and R.

For propelling the vehicle over bodies of substantially unbroken deep water, where it is sustained solely by its air cushion pads, the wheels 10—10 and 12—12 may be lowered and driven with the wheel treads partially immersed to function as rudimentary paddle wheels. In such event, the steering may be achieved in the same manner as on land or marginal terrain. However, due to the inefficiency of this mode of propulsion, it is desirable to provide one or more propellers 106 mounted at the free end of a hollow arm 107 pivotally supported at 108 from a bracket 109 which is swiveled through the floor of the leading vehicle section for steering movement about a vertical axis. Steering movement may be imparted to the bracket in any suitable manner, and power may be transmitted from the transmission 52 via its extension 52a and the hollow or tubular shaft 107 for rotating the propeller 106. The propeller 106 may be raised or lowered from and to operative position about its pivot 108.

DESCRIPTION OF OPERATION

During travel of the vehicle over marginal terrain, as for instance swamps, marshy areas, rice paddies, or the like, the load supporting function will be divided between the wheels and the air cushions in relative proportions which may be infinitely adjusted during travel to suit varying conditions. The adjustability is such as to permit variation from a condition in which substantially all of the support is by the wheels to one in which the entire support is by the air cushions and vice versa.

Thus, for travel over marshy areas partially or entirely covered by shallow water to varying depths, the air cushions 18 will be actuated by clutching the fan 20 to the engine 50, to support the vehicle above the water surface at a level in which the flexible skirts 28 of the respective pads just clear the water surface.

Where the water is relatively shallow, and the bottom substantially firm, the wheels normally will be projected downwardly to thrust against the bottom with sufficient force to support a substantial portion of the load and thus to provide firm driving engagement between the wheels and the bottom. Where the depth of the water increases or where the bottom becomes less firm, some of the wheels may be entirely out of contact with the bottom while the remaining wheels need engage the bottom only with sufficient force to provide traction for the vehicle so as to propel it forwardly while at the same time providing but a minimum amount of load support, leaving this almost entirely to the air cushion pads.

Directional control or steering may be achieved by variation of the horizontal angle or yaw between the vehicle sections, about steering axis 16, as for instance by simultaneously extending one of the cylinder piston units 14 while retracting the other.

The buoyancy derived from the air cushions 18 will minimize chances of any wheel 10 or 12 becoming mired in an extremely soft or slippery area of the bottom; but should this occur, the particular wheel or wheels may be raised and thereby freed while the load is supported by the air cushions and/or by other wheels. Thereafter, the wheels thus freed can be returned to operative position.

The propeller 106 will, at this time, be raised to an inoperative position since the function of propelling the vehicle will have been assumed by the wheels.

In addition to their function of forward propulsion of the vehicle, the wheels will cause the vehicle to ride over small islands, sand bars, mud flats, or other obstacles without damage to the air cushion pads. Contributing to this as well as to the achievement of maximum ground clearance is the provision of the flexible circular skirts 28 which depend from the respective rigid upper portions 27 of the pads. It will be appreciated that these flexible skirts 28 will readily yield without being damaged in passing over such obstacles.

During movement of the vehicle over marginal terrain as well as over water and, in fact, whenever the load support is provided primarily by the air cushions, the pitch lockout cylinder 90 between the vehicle sections is preferably released by actuation of the lockout valve 104 to permit relative free pitch movement between these sections to adapt them to wave action, to movement up and over banks, raised obstacles, and the like. The symmetrical disposition of the air pad cushions of each vehicle relative to the transverse pitch axis defined by its wheels will automatically tend to balance the vehicle section about its pitch axis. In this connection, it will be recalled that the weights of the respective vehicles and their loads will normally be substantially equally distributed on opposite sides of the wheel axis of each section.

Where the vehicle is required to climb a relatively steep bank, as in emerging from a body of water, the lead end of the forward vehicle section F will be free to tip up about its wheel axis under the action of its forward air pads 18 into vertical angular relation to the trailing vehicle section R. At this time, preferably all four wheels 10—10 and 12—12 will be driven so that the trailing section may partially push the forward section up the bank. To prevent vertical buckling or jackknifing of the vehicle sections on thus moving up the bank under thrust provided by the trailing section, the extensible and contractible link 90 may have its control valve 104 momentarily closed.

Before the wheels of the leading vehicle pass over the top of the bank, the link 90 normally will have been released to permit downward swinging of the forward section about the articulated coupling or connection C to an angular position below alignment with the trailing section. The wheels 10—10 on the leading section F are thus brought into tracking engagement with solid ground at the top of the bank to assist in pulling the trailing section R up the bank. During movement of the trailing section up the bank, the control valve 104 for the lockout cylinder may be actuated to afford a retarded release of the sections from their angular relationship to a position of generally horizontal alignment so that the interconnected end portions of the vehicle sections may pass freely over the bank without dragging. Also, if desired, the vehicles may be provided with a wheel W disposed beneath articulated connection C to prevent dragging.

In moving over a road or other comparatively hard surface, the wheels will be projected downwardly to fully lowered positions below the air cushion pads, and the wheels alone will normally be relied upon to support the vehicle as well as to provide the entire propelling force or thrust for propulsion. Steering will be achieved by way of variation of the yaw or horizontal angle between the vehicle sections about their articulated connection C under the control of the extensible and contractible piston and cylinder units 14. The radial fan 20 and the air cushions supplied thereby will normally be rendered inoperative by disengagement of the fan clutch during travel of the vehicle over firm ground or hard surfaces. Also, the cylinder and piston unit 90 will be locked to maintain the vehicle sections level.

On the other hand, during travel of the vehicle over an open body of water of substantial depth, the fan clutch will be fully engaged to activate the air pad cushions so that the entire weight of the vehicle will be sustained by them. The wheels will preferably be fully retracted during such use to avoid impeding the progress of the vehicle over the water, for which purpose the propeller 106 will serve as the propulsion means.

Having thus described our invention, we claim:

1. A vehicle for travel over marginal terrain, land and water, comprising front and rear body sections aligned with each other in the direction of movement of the vehicle and an articulated coupling interconnecting said sections for relative angular movement about pitch, yaw, and roll axes, steering means for relatively swinging said sections horizontally about their yaw axis, a single pair only of laterally spaced apart wheels carried by each body section for rotation about generally aligned axes transverse to the direction of movement of the vehicle, a plurality of air cushion pads disposed in a common horizontal plane beneath each of said body sections symmetrically to said generally aligned axes of its wheels, air supply means for said pads to provide air cushions beneath the respective pads for supporting the vehicle for movement over marginal terrain, means supporting the wheels of each body section for vertical adjustment between positions above and below said pads respectively, power means for effecting such vertical adjustment of the wheels, and power drive means for the respective wheels.

2. A vehicle as defined in claim 1, in which said generally aligned axes of the wheels of each body section extend substantially in a vertical plane common to the center of gravity of the said body section.

3. A vehicle as defined in claim 1, including selectively operable means for releasably restraining said sections against relative pitch movement during operation over solid terrain.

4. A vehicle as defined in claim 2, in which said air cushion pads for each vehicle body section comprise pairs of laterally spaced apart pads equidistantly spaced from said generally aligned axes of the wheels, and on opposite sides thereof, whereby the thrust of said pads will tend to balance each of said body sections about its said axes.

5. A vehicle as defined in claim 4, further including an air cushion pad mounted midway between said wheels of each body section.

6. A vehicle as defined in claim 1, in which said articulated connection between the vehicle body sections comprises a rigid tow link connected to one section for pivotal movement about said yaw axis, and having a free end projecting from said axis toward the other section, in combination with a cooperating link pivotally connected to said free end of the tow link for angular movement about a horizontal axis transverse to the vehicle movement, said cooperating link including a supporting shank trunnioned to the other body section for movement about a roll axis generally aligned with the direction of vehicle movement.

7. A vehicle as defined in claim 6, including power means for relatively angularly moving said vehicle bodies about said yaw axes, whereby to position said pairs of wheels at varying horizontal angles to each other for steering purposes.

8. A vehicle as defined in claim 7, in which said power means includes an extensible and retractible rigid fluid pressure actuated unit, interconnected between the free end portion of said tow link and a location on said one section eccentric to said yaw axis.

9. A vehicle as defined in claim 1, in which said air supply means comprises a radial fan and drive means for said fan carried by one said body section, and conduit means extending between said fan and the respective air pads for conducting the air discharge from the fan to all of the air pads, said conduit means including a flexible conduit section extending between and connected to said front and rear body sections, said flexible air conduit section enclosing and providing a housing for said articulated section.

10. A vehicle as defined in claim 9, in which said flexible conduit section is rotatably connected to one of the body sections for angular movement about a horizontal axis generally parallel with direction of movement of the vehicle and coincident with the roll axis of the body sections.

11. A vehicle as defined in claim 1, including mechanism supporting each of said wheels for vertical bodily movement independently of any other wheel, and power mechanism associated with said wheels for selectively raising said wheels from their positions wherein portions of their peripheries extend below the said air cushion pads to positions wherein said wheels are raised wholly above the lowermost level of the air cushion pads.

12. In a vehicle for travel over marginal terrain, land and water, a body section, a single pair only of laterally spaced apart wheels carried by said body section for rotation about generally aligned axes transverse to the direction of movement of the said body section, said axes being substantially beneath the center of gravity of said body section, a plurality of air cushion pads disposed in a common horizontal plane beneath said body section symmetrically to said generally aligned axes of its wheels, air supply means for said pads to provide air cushions beneath the respective pads for supporting the body section for movement over marginal terrain, means supporting the wheels of said body section for vertical adjustment between positions above and below said pads respectively, power means for selectively effecting such adjustment of the wheels and power drive means for the respective wheels.

References Cited

UNITED STATES PATENTS

| | | | |
|---|---|---|---|
| 3,057,319 | 10/1962 | Wagner | 115—1 |
| 3,266,757 | 8/1966 | Guienne | 180—121 |

ANDREW H. FARRELL, *Primary Examiner.*

U.S. Cl. X.R.

180—121